(12) United States Patent
Stoneberg

(10) Patent No.: US 6,799,973 B2
(45) Date of Patent: Oct. 5, 2004

(54) SYSTEM FOR TEACHING CHILDREN ABOUT THE USE OF MONEY

(75) Inventor: J. Bruce Stoneberg, Oak Brook, IL (US)

(73) Assignee: Safe-T Products, Inc., Lombard, IL (US)

( * ) Notice: Subject to any disclaimer, the term of this patent is extended or adjusted under 35 U.S.C. 154(b) by 0 days.

(21) Appl. No.: 10/234,230

(22) Filed: Sep. 4, 2002

(65) Prior Publication Data

US 2004/0043366 A1 Mar. 4, 2004

(51) Int. Cl.[7] .............................................. G09B 23/02
(52) U.S. Cl. ........................ 434/188; 446/75; 206/223
(58) Field of Search ................................ 434/188, 191; 446/72, 73, 75; 206/232, 83, 82, 84, 579, 315.1; 220/521, 522; 281/15.1, 22, 51

(56) References Cited

U.S. PATENT DOCUMENTS

| | | | | |
|---|---|---|---|---|
| 298,569 A | * | 5/1884 | Foster | |
| 3,595,382 A | * | 7/1971 | Hofer | 206/45.31 |
| 4,163,559 A | * | 8/1979 | Stenstrom | 273/148 A |
| 4,307,534 A | * | 12/1981 | Tomita | 46/39 |
| 4,761,008 A | * | 8/1988 | Huggins | 273/148 R |
| 5,139,266 A | * | 8/1992 | Mullins et al. | 273/240 |
| 5,366,069 A | * | 11/1994 | Seidner | |
| 5,379,887 A | * | 1/1995 | Conley, Jr. | 206/232 |
| 5,456,352 A | * | 10/1995 | McQueeny | 206/223 |
| 5,477,961 A | * | 12/1995 | Taniyama | 206/310 |

* cited by examiner

Primary Examiner—Derris H. Banks
Assistant Examiner—Jamila O Williams
(74) Attorney, Agent, or Firm—Michael Best & Friedrich LLP

(57) ABSTRACT

A covered money holding tray with a series of toy money holding compartments and a cavity for receiving a book such that when the cover is closed with the book in place, the compartments are closed off, preventing the contents of the open compartments from spilling out should the tray be moved about, with the cover in a preferred embodiment being clear or translucent so that the cover or back of the book can be read when the cover is closed.

4 Claims, 6 Drawing Sheets

SYSTEM FOR TEACHING CHILDREN ABOUT THE USE OF MONEY

BACKGROUND OF THE INVENTION

This invention relates generally to money holders and, more particularly, to money holders that are particularly well adapted to be used in teaching children about the use of money.

It is well recognized that providing children with toy money in the form of bills and coins in the course of teaching the use of money makes the lessons more real and therefore easier to grasp. Since sorting the coins and bills is an important part of these lessons, systems for segregating and holding coins would be an important adjunct to such hands-on teaching. In order to meet the rigorous requirements of active children using such systems, it is important that such systems hold the coins and bills securely in appropriate sorting compartments.

Also, instructional books are often provided to aid in the learning process. It would advance the art if the system included a single container that would hold not only the coins and bills, but also an instructional book. This would ensure that the book is always at hand when it is desired to use the container in teaching the use of money. Also, if the top surface of the book could be seen when inside the closed container to identify the book (and optimally also its purpose) it would further facilitate the use of the system.

The present invention satisfies the above needs by providing a system including a container with a series of secure compartments for holding and segregating coins and bills. It ensures that the coins and bills do not spill over into adjacent compartments when the container is jostled or even turned over. Also, the single container holds not only the coins and bills, but also an instructional book to ensure that the book is always at hand when it is desired to use the container in teaching the use of money. Also, in a preferred embodiment, the top surface of the book can seen when inside the closed container.

SUMMARY OF THE INVENTION

The invention comprises a system for teaching children about the use of money including an instruction book having a cover and a back, a tray with a compartment area for holding different denominations of play money, a cover for closing the tray, and a cavity for receiving the book. The cavity for receiving the book may be either in the cover or it may be in the compartment area. The cover maybe translucent or clear so that when the book is positioned in the cavity with either its cover or its back exposed, the back or the cover can be seen. The invention also comprises a method system for teaching children about the use of money using the system described above.

DESCRIPTION OF THE DRAWINGS

The features of this invention which are believed to be novel are set forth with particularity in the appended claims. The invention, together with its objects and advantages, may be best understood by reference to the following description taken in conjunction with the accompanying drawings, in which like reference numerals identify like elements in the several figures and in which:

DETAILED DESCRIPTION OF THE INVENTION

Figure 1:
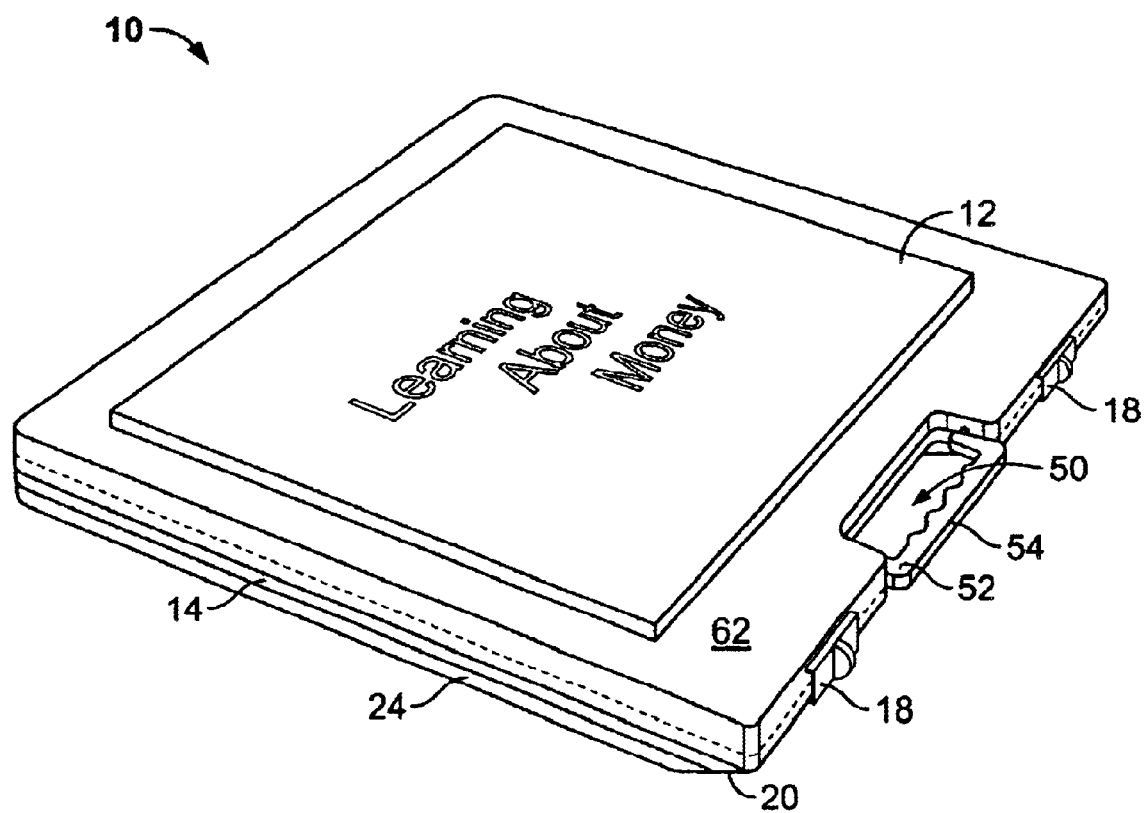
FIG. 1 is a perspective view of the system of the present invention, in its closed and locked configuration.
Figure 2:
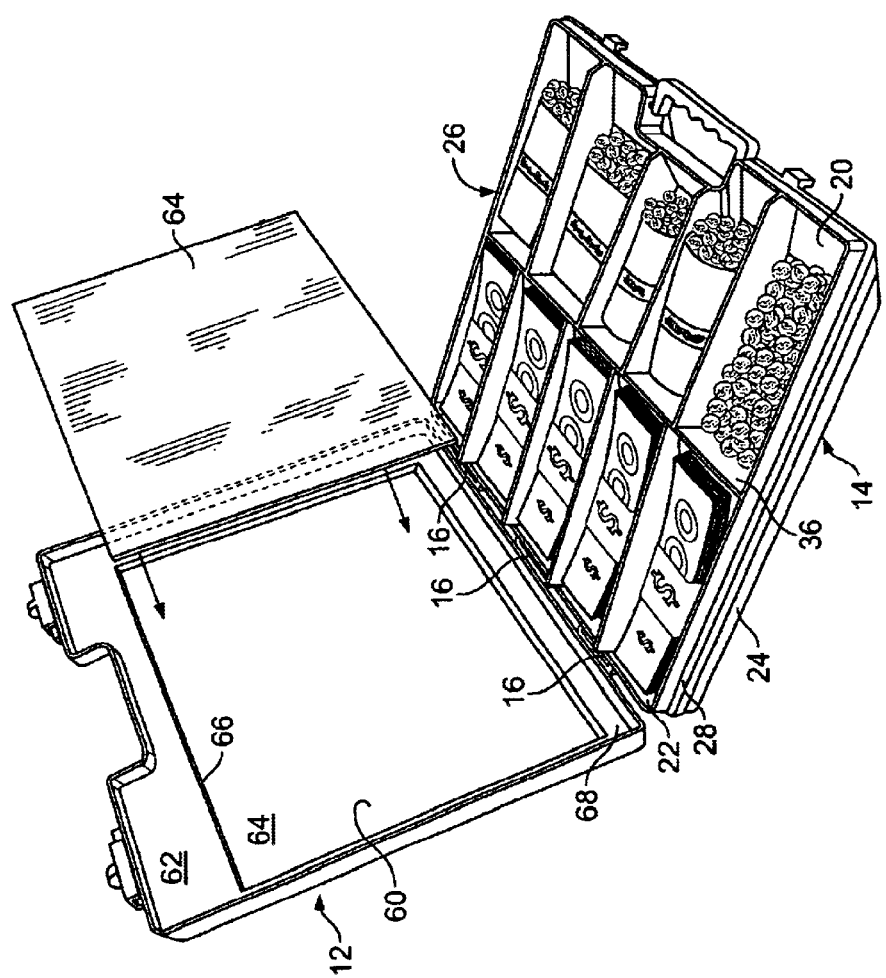
FIG. 2 is a perspective view of the system of the invention, in its open position, with the bills and coins distributed in the compartments of the tray of the system.

Turning now to FIGS. 1 and 2, there is illustrated a system in accordance with the present invention for teaching children about the use of money comprising a toy money holder 10, having a cover 12 and a tray 14. Cover 12 is attached to tray 14 by a series of three hinges 16. When the cover is closed upon the tray, as illustrated in FIG. 1, it may be locked in the closed position by two latches 18, which are described in more detail below.

Tray 14 includes a front angled wall 20, a rear vertical wall 22, and pair of sidewalls 24 and 26. The front and rear walls and the side walls include a continuous generally horizontal ledge 28 extending from the front, rear, and side walls.

Figure 3:
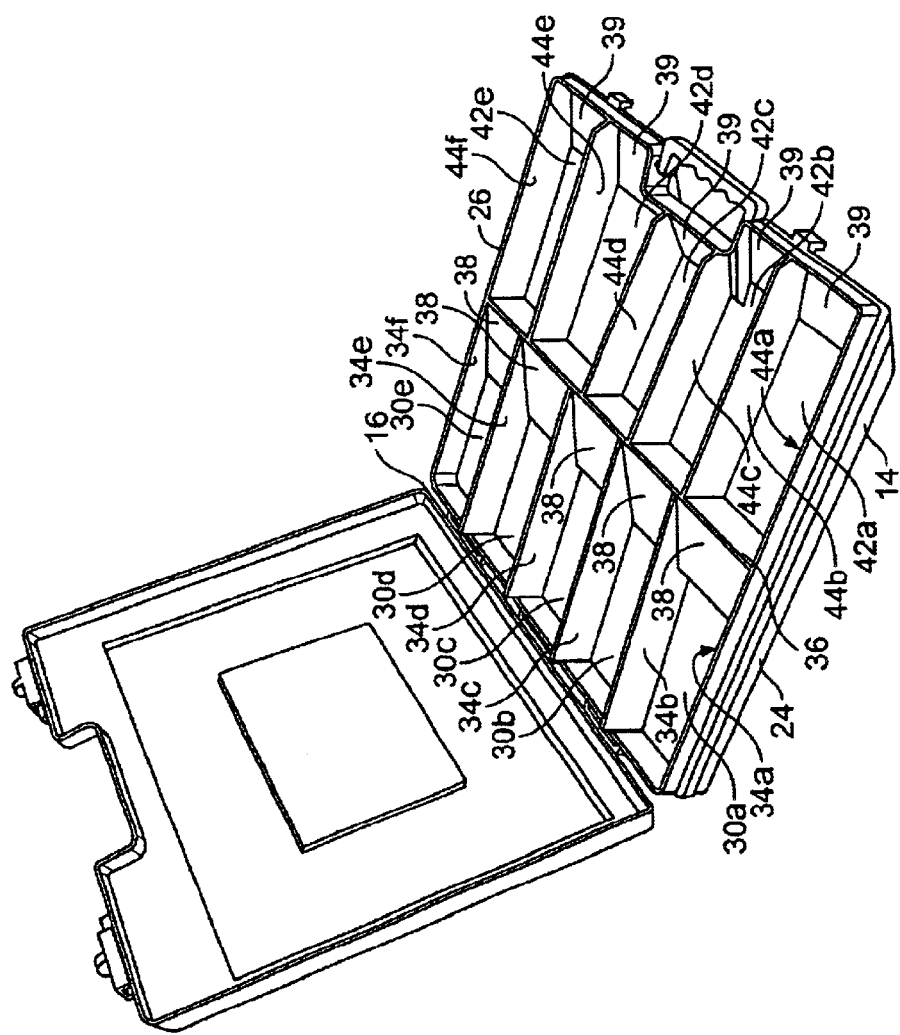
FIG. 3 is a perspective view of the system of the invention corresponding to that of FIG. 2, in which the bills and coins are absent.

As shown in FIG. 3, tray 14 includes a series of five generally rectangular adjacent rear compartments 30a, 30b, 30c, 30d and 30e. The rear walls of these adjacent rear compartments comprise portions of the inner surface of rear vertical wall 22 of the tray. The sidewalls of compartments 30a, 30b, 30c, 30d and 30e comprise respectively a portion 34a sidewall 24 and vertical divider 34b, vertical dividers 34b and 34c, vertical dividers 34c and 34d, vertical dividers 34d and 34e, and vertical divider 34e and portion 34f of sidewall 26. The floor of each of these compartments is generally horizontal. Also, the tray includes a generally vertical dividing wall 36. Ramps 38 optimally are located at the front of each of the compartments. These ramps 38 are at approximately a 45-degree angle to the bottom of the tray. Compartments 30a, 30b, 30c, 30d and 30e are respectively dimensioned to receive play money, which in the illustrated embodiment of FIG. 2 comprises $1, $5, $10, $20 and $50 bills. Ramps 39 in each of the compartments support the forward edge of the play money, as shown, making it easier to slide individual bills forward and out of the compartments when the tray is used in teaching how to handle money or in purely play situations.

The tray is partitioned at approximately its midpoint by dividing wall 36. Portions of this wall form the back walls of a corresponding series of adjacent forward compartments 42a, 42b, 42c, 42d and 42e. The front walls of these compartments comprise the back surface of front angled wall 20 of the tray. The individual compartments consist of portion 44a of sidewall 24 and vertical wall 44b, vertical walls 44b and 44c, vertical walls 44c and 44d, vertical walls 44d and 44e, and vertical wall 44e with portion 44f of side wall 26. Compartments 44a, 44b, 44c and 44d, which are of varying widths, are intended to receive different play coins, including pennies, nickels, dimes, quarters and either half dollar or one dollar coins, as illustrated in FIG. 2. The sizes of the compartments are chosen to correspond to the sizes of the coins, i.e., larger compartments for larger coins.

Figure 4:
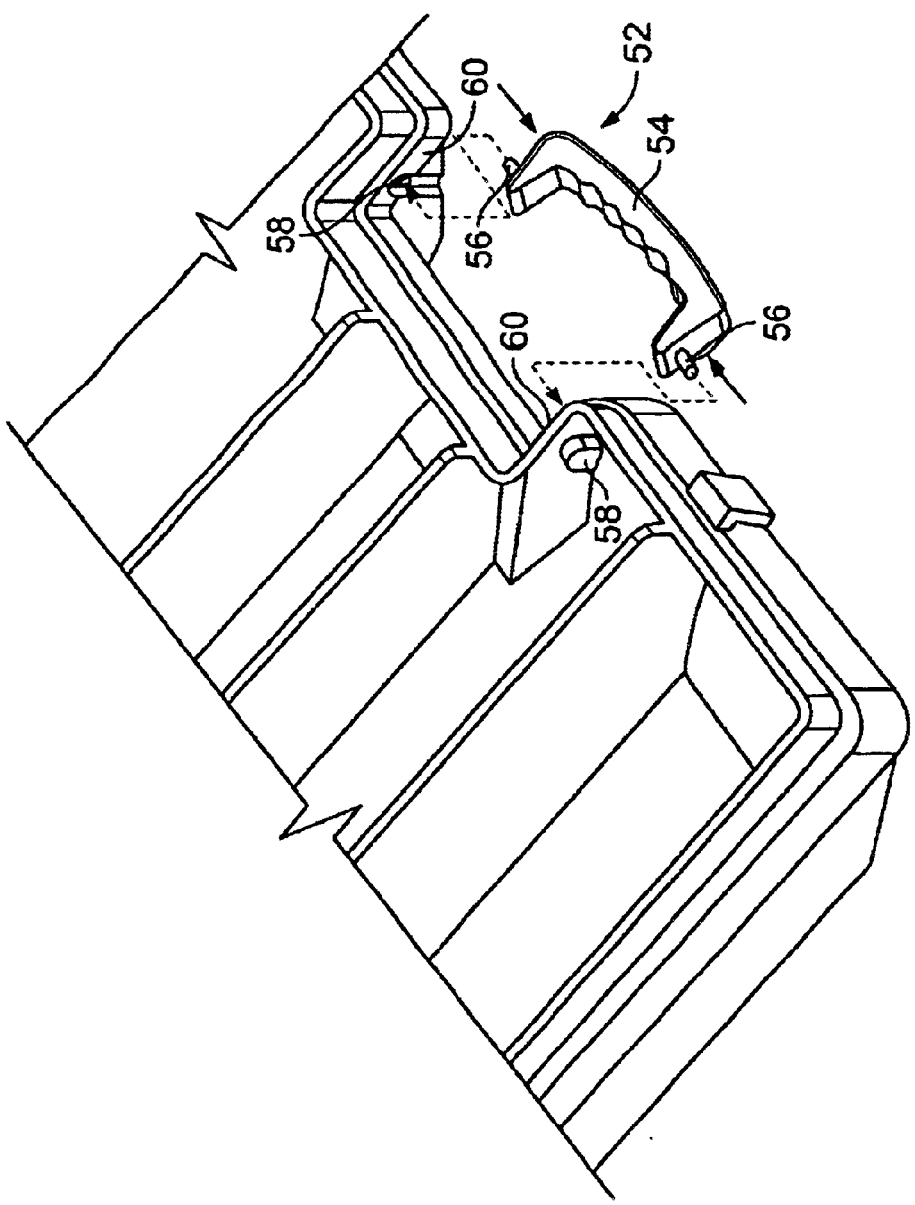
FIG. 4 is an enlarged partial perspective view of a portion of the front of the tray of the above figures, illustrating the mounting of the handle within a cavity in the front of the tray.

As can be seen, for example, in FIGS. 1 and 4, the front edge of the tray includes a cutout portion 50 for receiving a handle 52. Handle 52 includes a contoured gripping portion 54 and horizontally outwardly disposed pins 56 at the ends of the handle. These pins are received in holes 58 in portions 60 in cutout portion 50 of the front wall of the tray.

Figure 5A:
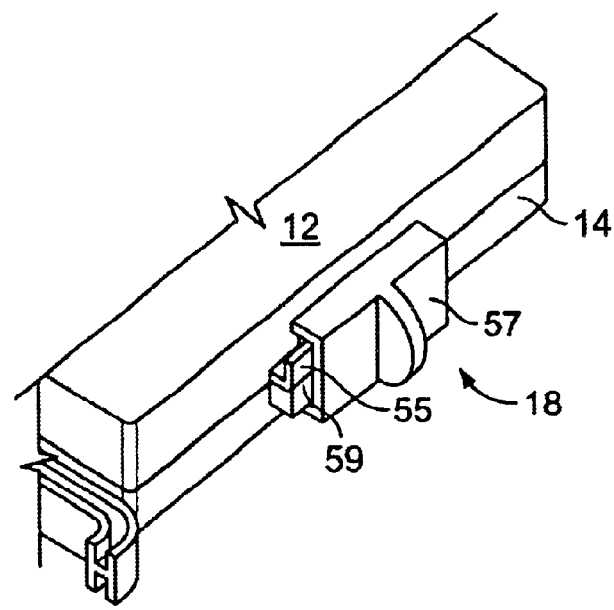
FIGS. 5A–5B are partial perspective views of the locking mechanism of the system of the invention.
Figure 5B:
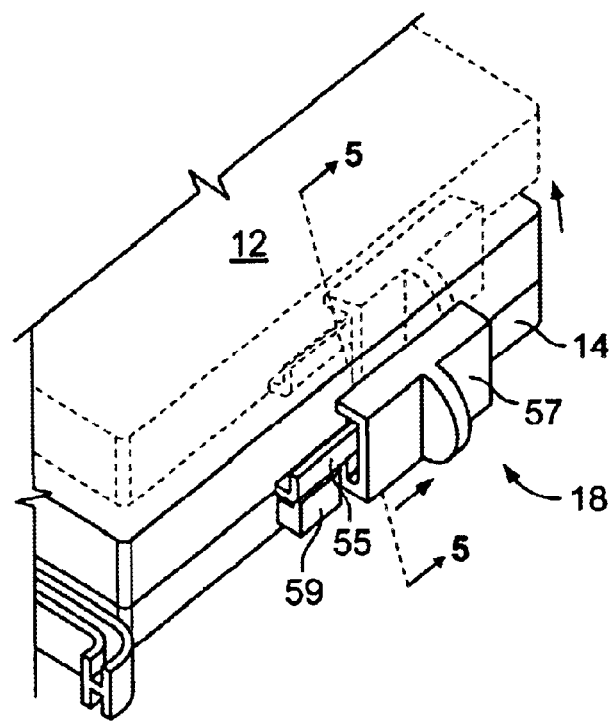

As illustrated in FIGS. 5A and 5B, latches 18 are provided to lock the cover onto the tray when it is in its closed position (FIG. 1). These latches include an "L" shaped support member 55 protruding forwardly from the tray to slidingly retain a locking member 57 which engages locking block 59 protruding forwardly from the tray when the cover is closed down upon the tray to lock the tray in place.

Finally, cover 12 includes a book-receiving cavity 60 which is formed in the top surface 62 of the cover, as illustrated in FIG. 2. This cavity is of a depth generally corresponding to the thickness of an instructional book 64 intended to be placed in the tray and stored there when the tray is not in use. Cavity 60 includes a flat horizontal bottom surface 64 surrounded by an adjacent vertical wall 66 of a height preferably corresponding to the thickness of book 64 (FIG. 3), although its height may be slightly larger than the thickness of the book. When the book is in place, the exposed surface (cover or back of the book) is generally co-planer with the portion 68 of surface 62 surrounding cavity 60, thereby presenting a continuous generally flat bottom surface which touches or is spaced slightly from walls to top edges of 30b–30f, 44b–44f, and 36 when the cover is closed, effectively isolating each of the cavities from the other, to prevent either coins or bills from sliding between cavities and interfering with the order established by child using the toy money holder.

In a preferred embodiment, cover 12 is clear or translucent, so that the front or back of the book positioned therein can be read without opening the box. This aids in identifying the nature and purpose of the box, as when, for example, the cover of the book is entitled "Learning About Money" which can be viewed as shown in FIG. 1. It also adds interest to the toy money holder, making it more likely it will be used by a child as intended.

Figure 6:
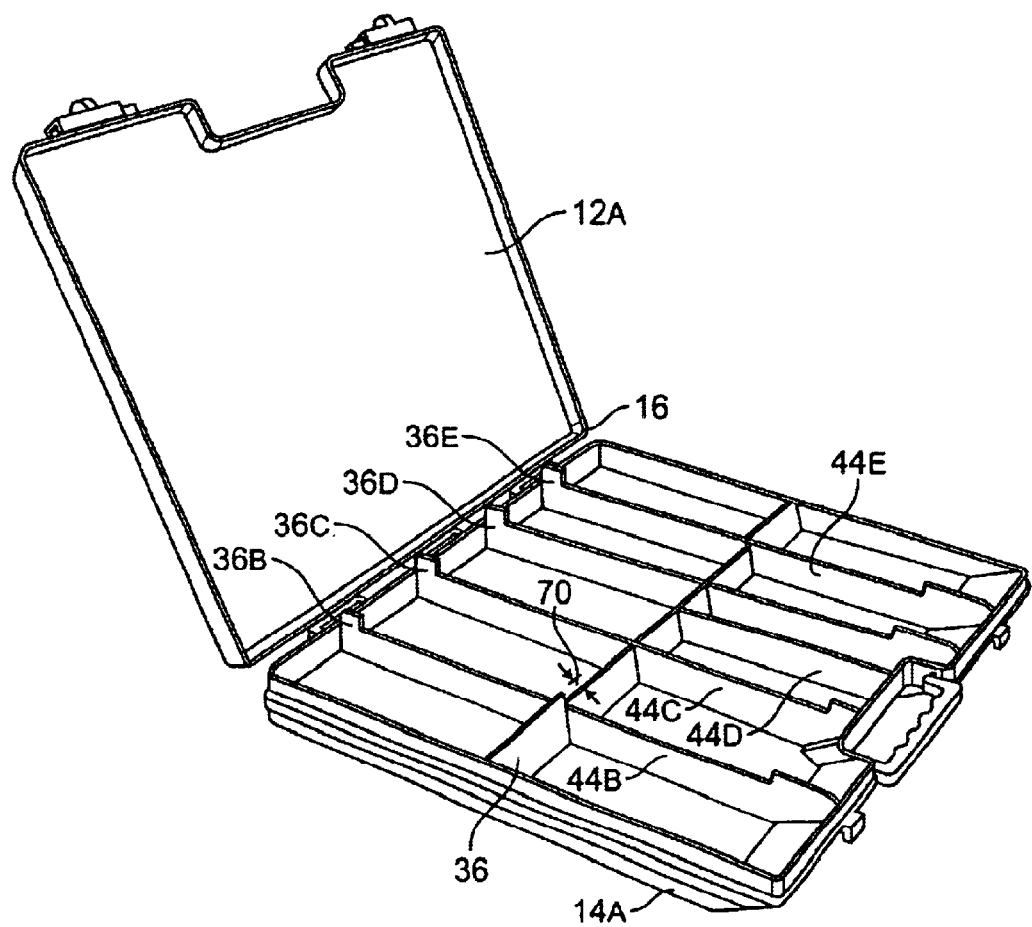
FIG. 6 is a perspective view of an alternate embodiment of the invention in which a book may be positioned in the tray of the system.

In an alternate embodiment of the invention illustrated in FIG. 6, cover 12A and 44B–44E, as well as the corresponding portion of wall 36 have been undercut to a depth 70 corresponding to the thickness of book 64. The length and width of the undercut area correspond respectively to the length and width of the book. Thus, in this embodiment, when the child has completed play with the system of the invention, he or she simply lays the book in the cavity formed by these wall cutouts and closes cover 12A down onto tray 14A, and locks the cover in place on the tray. As in the previous embodiment, the bills and coins remain trapped in their corresponding compartments, so that the covered tray can be transported without mingling its contents.

In yet another embodiment, corresponding cavities may be formed in both the cover and tray, generally as illustrated in FIGS. 1–3 and 6, where the total height of the cavities in the cover and tray together correspond to the height of the book. This would also enable the book to be positioned in a cutout in the tray and the cover closed down upon it to trap the bills and coins in appropriate compartments.

While the present invention is described above in connection with preferred or illustrative embodiments, these embodiments are not intended to be exhaustive or limiting of the invention. Rather, the invention is intended to cover all alternatives, appended claims.

What I claim is:

1. A method for learning about the use of money comprising:

providing a book with instructions about the use of money having a cover and a back;

providing a tray with compartments for holding different denominations of play money, a cover for closing the tray, and a cavity for receiving the book in the cover, the book being received in the cavity in the cover, removed from the cavity in the cover, and returned to the cavity in the cover during the course of learning about the use of money, and the cover being closed down onto the tray with the book in the cavity, money in the compartments and the book directly trapping the money in the compartment;

opening the cover and removing the book to access the tray;

using the tray and play money as instructed in the book;

returning the book to the cavity;

closing the cover onto the tray; and transporting the closed tray as desired.

2. The method of claim 1 in which the cover is clear or translucent, so that the cover or back of the book can be read through the tray cover when the cover is closed.

3. A method for learning about the use of money comprising:

providing a book with instructions about the use of money having a cover and a back;

providing a tray with compartments for holding different denominations of play money, a cover for closing the tray, and a cavity for receiving the book in the cover and the tray, the cover being closed down onto the tray with the book in the cavity and money in the compartments, the cavity being in both the cover and the tray and the book being received in the cavity in the cover and the tray, removed from the cover and the tray and returned to the cover and the tray during the course of learning about the use of money;

opening the cover and removing the book;

using the tray and play money as instructed in the book;

returning the book to the cavity;

closing the cover onto the tray; and transporting the closed tray as desired.

4. The method of claim 3 in which the cover is clear or translucent, so that the cover or back of the book can be read through the tray cover when the cover is closed.

* * * * *